US009521179B2

(12) United States Patent
Chakarapani et al.

(10) Patent No.: US 9,521,179 B2
(45) Date of Patent: Dec. 13, 2016

(54) VALIDATION OF LIVE MEDIA STREAM BASED ON PREDETERMINED STANDARDS

(71) Applicant: Verizon Patent and Licensing Inc., Arlington, VA (US)

(72) Inventors: Lakshmi N. Chakarapani, Irving, TX (US); Amit B. Patadia, Plano, TX (US); Gaurav Rinwa, Irving, TX (US); Rajalingam Mariappan, Chennai (IN); Pushparaj Bhaskaran, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 240 days.

(21) Appl. No.: 14/332,899

(22) Filed: Jul. 16, 2014

(65) Prior Publication Data

US 2016/0021164 A1    Jan. 21, 2016

(51) Int. Cl.
| | |
|---|---|
| G06F 13/00 | (2006.01) |
| H04L 29/06 | (2006.01) |
| H04L 29/08 | (2006.01) |
| H04L 12/26 | (2006.01) |
| G06F 17/30 | (2006.01) |

(52) U.S. Cl.
CPC ....... *H04L 65/607* (2013.01); *G06F 17/30053* (2013.01); *G06F 17/30784* (2013.01); *H04L 43/50* (2013.01); *H04L 65/4084* (2013.01); *H04L 65/608* (2013.01); *H04L 67/02* (2013.01); *H04L 63/0428* (2013.01)

(58) Field of Classification Search
CPC .... H04L 29/08072; H04L 29/06; H04L 43/00; H04L 12/2602; H04L 41/22; H04L 43/50; H04L 63/0428; H04L 65/608; H04L 65/706; H04L 65/4084; H04L 67/02; G06F 17/30053; G06F 17/3078
USPC ........................................................ 709/224
See application file for complete search history.

(56) References Cited

U.S. PATENT DOCUMENTS

| | | | | |
|---|---|---|---|---|
| 2013/0061129 A1* | 3/2013 | Liu | ......................... | H04L 67/22 715/234 |
| 2014/0006478 A1* | 1/2014 | Eguchi | .................. | H04L 65/605 709/203 |

\* cited by examiner

*Primary Examiner* — Robert B Harrell (57) ABSTRACT

A method includes receiving at least one manifest file, playlists and video chunks for at least one channel of a live media stream. The method includes validating, by a processing device, the live media stream to ensure that the at least one manifest file, the playlists and the video chunks are available. Validating the live media stream includes determining whether the at least one live media stream complies with at least one predetermined standard. The method includes validating the live media stream to ensure that the files are not stale and live. The method also includes validating the live media stream to ensure that the video chunks are properly sequenced, and validating the live media stream based on Hypertext transfer protocol (HTTP) headers for the video chunks to determine whether errors are received associated with the live video stream.

20 Claims, 9 Drawing Sheets

Content-Type: application/x-mpegurl
Date: Sun, 13 Apr 2014 02:14:52 GMT
Etag: W/"842cd5f8bd56cf1:0"
Last-Modified: Sun, 13 Apr 2014 02:13:34 GMT
Server: Serverbrand-IIS/7.5
X-Powered-By: ASP.NET
Content-Length: 380

520

EXTM3U
EXT-X-VERSION:3
EXT-X-TARGETDURATION:11
EXT-X-MEDIA-SEQUENCE:211126
EXT-X-KEY:METHOD=AES-128,URI="https://www22.ottservices.servprovider.com/CE/protected/userkeys/ul-vdms/tbsh-res/776308.key",IV=0x00000000000000000000000000000000
EXTINF:10.01,
20140319T142046-03-211126.ts
EXTINF:10.01,
20140319T142046-03-211127.ts
EXTINF:10.01,
20140319T142046-03-211128.ts

FIG. 5

- 620  26453  2014-04-12 20:24:07.422116000  192.168.2.23  72.21.81.253  HTTP  455  GET /FS01/encoreh/08.m3u8 HTTP/1.1
- 630  26461  2014-04-12 20:24:07.441364000  72.21.81.253  192.168.2.23  HTTP  569  HTTP/1.1 503 Service Not Available (text/html)
- 640  26462  2014-04-12 20:24:07.441682000  192.168.2.23  72.21.81.253  HTTP  479  GET /FS01/encoreh/20140404T211833-02-43860.ts HTTP/1.1
- 650  26464  2014-04-12 20:24:07.463487000  72.21.81.253  192.168.2.23  HTTP  569  HTTP/1.1 503 Service Not Available (text/html)

VALIDATION OF LIVE MEDIA STREAM BASED ON PREDETERMINED STANDARDS

BACKGROUND

Many of today's entertainment or communication-related electronic user devices rely on receiving, transmitting, and/or using streaming digital data or content. Adaptive bit rate streaming is a technique for streaming digital data (particularly, multimedia content) over digital networks. Adaptive bit rate streaming may include detecting a bandwidth capacity and central processing unit (CPU) capacity of the user device in real time and adjusting the quality of a video stream accordingly to allow continuous streaming with a highest quality stream of the different bit rate streams corresponding to a current bandwidth capacity and CPU capacity of the user device.

In some implementations, a streaming client of a user device may access a manifest file (also referred to as a variant playlist file) that identifies different streams of an identical piece of content available for download at differing bit rates. The streaming client may also access index files that identify segments of the streams, and the order in which the segments are to be played. In some instances, when starting streaming of content, the streaming client requests segments from the lowest bit rate stream from a streaming server.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed. As used herein, the term "content" may refer to audio and/or video content (e.g., a movie, a three-dimensional (3D) movie, show, television program, video stream, audio stream, Internet radio, broadcast of a live event (e.g., sporting event, concert, etc.)), etc.

Systems and/or methods described herein may provide a live media stream validation client that validates live media streams to ensure that the media streams play normally (i.e., according to a set or expected routine for playback of the media streams). Validating the live media stream includes determining whether the at least one live media strewn complies with predetermined standards for playback of the live media stream, and indicating that the live media stream (or portion of the live media stream) is validated if it complies with the predetermined standards. The systems may receive live media streams from a content distribution network. The live streams may be available to client devices (e.g., end users/customers). The live media stream validation client may analyze and validate the live media streams to ensure that the live media streams (e.g., the video chunks and playlists) play according to a predetermined format. Live media streams that fail validation may be marked for processing by network personnel in order to fix issues that cause the deviation from the predetermined standards.

Consistent with embodiments, the live media stream validation client may execute in a similar manner to a Hypertext transfer protocol (HTTP) live streaming (HLS) client and access a manifest file, playlist and video chunk files for each of available channel of content. In other embodiments, the systems and methods may be to other media formats based on particular requirements and components of the media formats (e.g., Smooth Streaming, DASH, etc). The live media stream validation client may validate and, in some instances, display the video content on an associated display. The systems may ensure that manifest files, playlist and chunks are available to client devices. The systems may also ensure that files are not stale and live (i.e., that the playlists have not already been played or provided to the client during that portion of the viewing session). The systems may ensure the video chunks are properly sequenced and not missing any chunks in a video sequence. Consistent with embodiments described herein, the systems may monitor every playlist within a channel and follows the stream by continually looking for HTTP headers in the video chunks.

Figure 1:
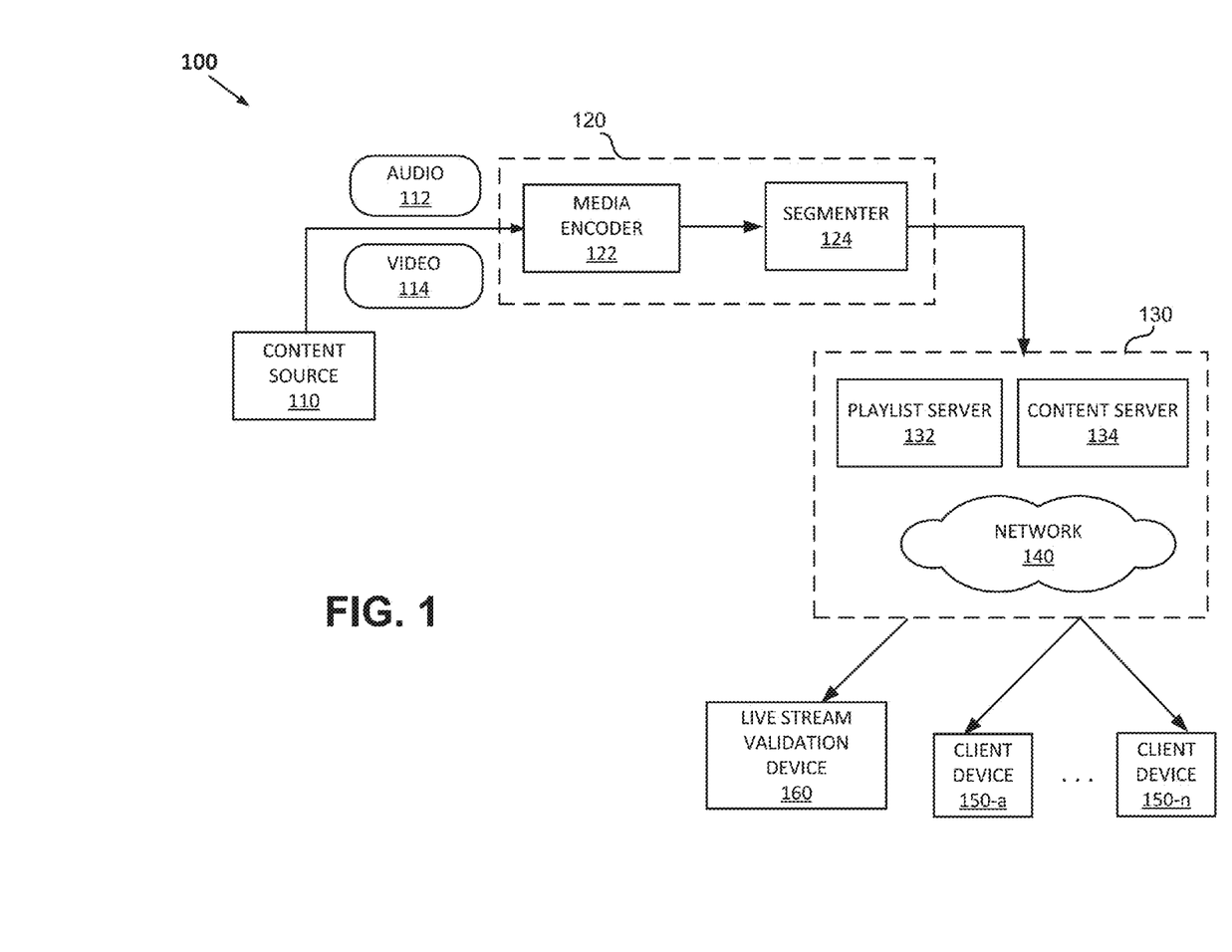
FIG. 1 illustrates an exemplary system for streaming content.

FIG. 1 is a block diagram of an exemplary network 100 in which systems and methods described herein may be implemented. As shown, system 100 may include a content source 110 (audio inputs 112 and video inputs 114), a streaming media processing system 120, a content distribution system 130, a network 140, a plurality of client devices 150, and a live media stream validation client (or device) 160. These components/devices are described below in greater detail with references to FIGS. 2-8.

Briefly, content source 110 may include a live (or prerecorded) audio or video source that provides audio inputs 112 and video inputs 114 that may be received by the streaming media formatting system 120. Content source 110 may include content from a live broadcast source, pre-recorded video, etc.

Streaming media processing system 120 may process content (audio and video inputs 112/114) from content source 110 into a format that may be provided to client devices 150 on different platforms (e.g., Android, Xbox, tablets, smartphones, computers, televisions, etc.). Streaming media formatting system 120 may include encoder 122 and stream segmenter 124.

Encoder 122 may receive media inputs 112/114 from content source 110 and encode the media based on a format such as, for example, H.264, MPEG-4 Advanced Video coding (AVC), high efficiency advanced audio coding (HE-AAC), etc. Encoder 122 may encode the content source at different bit rates to form different bit rate streams for the same content item. A bit rate stream is a media stream that is provided at a particular bit rate. Encoder 122 may generate a plurality of bit rate streams corresponding to a particular content item (e.g., a movie or television show). Multiple different bit rate streams for a same content item may be referred to as variant streams. Encoder 122 may send the encoded media in a transport stream (e.g., MPEG-2) to segmenter 124 for downstream processing.

Segmenter 124 may receive (or retrieve) the bit rate streams corresponding to the content item and partition the streams into a plurality of segments corresponding to the each of the different bit rate streams. Segmenter 124 may be configured to split a source content from content source 110 into a number of stream segments corresponding to media streams for the particular content. In some instances, segmenter 124 may be configured to generate segments corresponding to more than one stream, such as a number of bit rate streams for differing quality, bit rates, output resolution, etc. Segmenter 124 may chunk (or divide into even portions) video into discreet time framed packets in different stream groups. For ease of discussion, stream groups are described as corresponding to different bit rate streams, however it should be understood the concepts described herein may be applied to streams of differing quality, resolution, etc.

Segmenter 124 may generate one or more index files or playlists that indicate the order in which segments are to be played for each respective bit rate stream and that additionally point to the locations of segments. Segmenter 124 may generate a number of playlist files corresponding to the number of variant streams indicated in the variant playlist. Segmenter 124 may generate a corresponding number of playlists for multiple bit rate streams. The playlist files indicate the order in which the segments are to be played and identify the individual media files for download by client devices. Examples of index/playlist files may include M3U8 files, M3U files, PLS files, Advanced Stream Redirector (ASX) files, etc.

Segmenter 124 may generate a file that identifies different bit rate streams available for download. When multiple bit rate streams are provided for a single content item, streaming media formatting system 120 may generate a file that identifies the various available bit rate streams and their corresponding playlist files. This file is sometimes referred to as a manifest file or variant playlist. Depending on the streaming protocol implemented, this file may be referred to by different names. For HTTP Live Streaming from Apple Inc., the file is referred to as a variant playlist (VP). For Smooth Streaming from Microsoft® the file is referred to as a manifest file or client manifest file (e.g., an .ismc file). For Adobe® Flash the file is referred to as a "smil" file. Although named and formatted differently, each of these file types includes similar types of information relating to identifying a number of different available bit rate streams for a particular content item.

Content distribution system 130 may host the live streaming video content that is to be distributed via networks (e.g., the Internet) to client devices 150. Content distribution system 130 may include a playlist server 132 and a content server 134. Content distribution system 130 may distribute or serve playlists and stream segments to client devices 150 via playlist server 132 and content server 134, respectively, over network 140.

Content server 134 may include (or provide access to storage locations for) segments generated by segmenter 124. Content server 134 may provide a number of different streams of an identical piece of content, such as content streams corresponding to a number of different criteria, such as bandwidth, bit rate, resolution, etc.

Playlist server 132 may include playlists generated by segmenter 124. Playlist server 132 may also include variant playlists which may be provided by segmenter 124. Playlist server 132 may provide playlists and/or variant playlists to client devices 150 in response to requests for particular playlists received from client devices 150.

Client device 150 may request and receive variant playlists from playlist server 132. Client device 150 may, based on various factors, such as available bandwidth and output resolution, select a particular bit rate stream identified in the variant playlist. Client devices 150 may access a particular playlist identified in the variant playlist and may receive and play content segments in accordance with the information provided in the particular playlist.

Live media stream validator client 160 may validate the playlists and video chunks for consumption by client devices 150, such as described below with respect to FIG. 3. Live media stream validator client 160 may execute (behave or function) in a similar manner to a client device 150 (e.g., HLS client). Live media stream validator client 160 may get the manifest playlist and video chunk files for each of the channel and subsequently validate and display the channels. Live media stream validator client 160 may ensure that manifest files, playlists and chunks are available for client devices 150. Live media stream validator client 160 may ensure files are not stale (i.e., that the files have not already been played) and live (e.g., playing concurrently with a live broadcast). Live media stream validator client 160 may display a live dashboard for every playlist in a channel (both for audio and video channels).

Depending on the implementation, system 100 may include additional, fewer, or different components than those illustrated in FIG. 1. For example, in one implementation, system 100 may include additional content sources 110, encoders 122, stream segmenters 124, playlist servers 132, content servers 134, client devices 150, live media stream validator clients 160, etc. Furthermore, although not illustrated in FIG. 1, in an actual implementation, system 100 may include different network components, such as switches, bridges, routers, gateways, firewalls, different types of client/server devices, etc.

Figure 2:
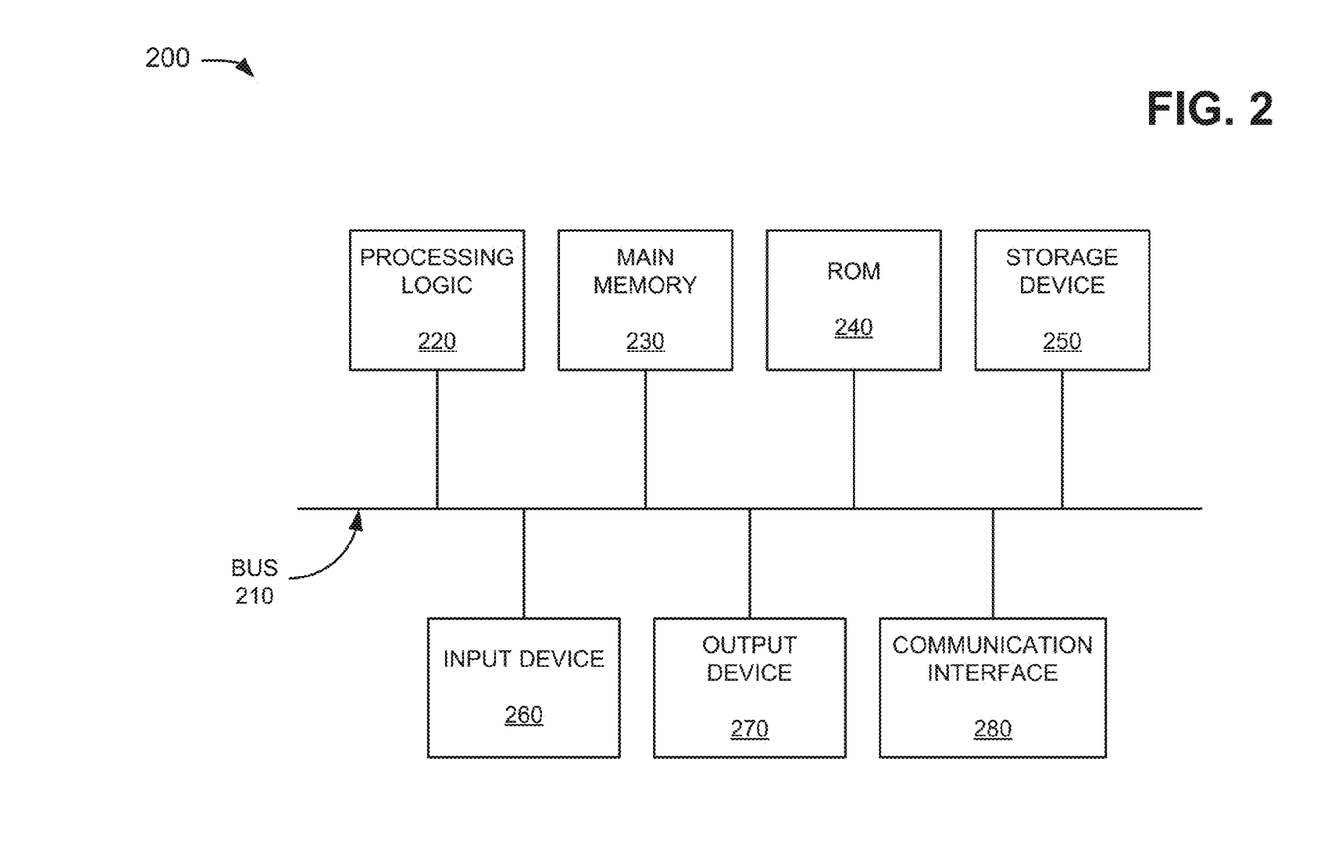
FIG. 2 illustrates exemplary components of one or more devices depicted in FIG. 1.

FIG. 2 is an exemplary diagram of a device 200 that may correspond to any of content source 110, encoder 122, segmenter 124, playlist server 132, content server 134, client device 150 and/or live media stream validator client 160. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a. ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing machine-readable instructions (i.e., software instructions) contained in a computer-readable medium, such as main memory 230. A computer-readable medium may be defined as a physical or logical memory device. The machine-readable instructions may be read into main memory 230 from another computer-readable medium, such as storage device 250, or from another device via communication interface 280. The machine-readable instructions contained in main memory 230 may cause processing logic 220 to perform processes described herein. Alternatively, hard-wired circuitry may be used in place of or in combination with machine-readable instructions to implement processes described herein. Thus, implementations described herein are not limited to any specific combination of hardware devices, circuitry, and/or machine-readable instructions.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
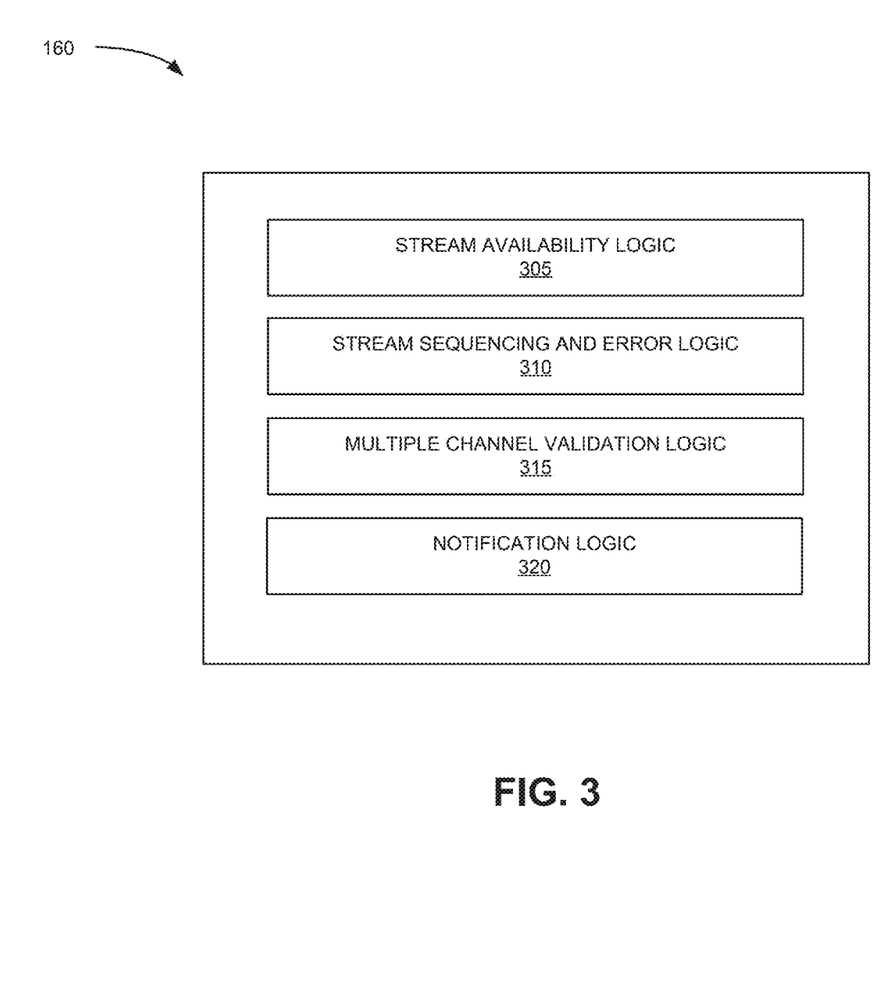
FIG. 3 is an exemplary functional block diagram of components implemented in the live stream validation device of FIG. 1.

FIG. 3 is an exemplary functional block diagram of components implemented in live media stream validation client 160. In an exemplary implementation, all or some of the components illustrated in FIG. 3 may be stored in memory 230. For example, referring to FIG. 3, memory 230 may include stream availability logic 305, stream sequencing and error logic 310, multiple channel validation logic 315 and notification logic 320. In addition, various logic components illustrated in FIG. 3 may be implemented by processing logic 220 executing one or more programs stored in memory 230.

Client devices 150 may experience difficulties playing live media streams, such as client buffering conditions, inability to play, or video player exit. These variances from normal playback operations may arise from difficulties in accessing or ordering (receiving in proper sequence) the playlist files, and video chunks on either or both of the client side or the service provider side. For example, the streaming component of the service provider may miss publishing a video chunk. Alternatively, the playlist file may become stale (or may not be updated). The sequence of numbers of video chunks may be distorted (or messed up). In other instances, the streaming component may publish an incomplete playlist. The content distribution network may cache a playlist file so that the playlist file contains an older version of the playlist (causing client devices 150 to loop back). Live media stream validation client 160 may implement procedures to validate the live media stream and to identify on the client side of the network when these issues occur.

Stream availability logic 305 may behave in a similar manner as a video player client (e.g., an HLS client) and retrieve the manifest file (main channel file), playlist and video chunk file for each of the channels that are to be validated or displayed. Stream availability logic 305 may validate the live media stream to ensure that manifest files, playlist and chunks are available. Validating the live media stream may include determining whether the live media stream complies with a predetermined standard, and indicating that the live media stream is validated if it complies with the predetermined standard. For example, the predetermined standard may include current availability of a play list, availability of video chunks, proper sequencing and duration of video chunks, etc. Live media streams that do not comply with predetermined standards for live media streams may play incorrectly, experience buffering issues, not play at all, etc. Stream availability logic 305 may ensure that media streams are available for consumption by client devices 150. Stream availability logic 305 may parse out sub-playlist files for each bandwidth available for each particular channel. Stream availability logic 305 may perform a client side check for elements of the media stream that are required for normal playback of the live media streams. Stream availability logic 305 may ensure files are not stale and live. Stream availability logic 305 may make sure that all playlists available for both audio and video segments. Stream availability logic 305 may make sure that the live media stream confines (or conforms) to a particular protocol and that all chunks available.

Stream availability logic 305 may monitor every playlist within a channel and follow the stream by continually looking for HTTP headers in the video chunks. Stream availability logic 305 may examine HTTP headers to determine parameters for the client side file, such as request time, and last modified time. Stream availability logic 305 may require that the published time of chunk not be older than a predetermined limit (e.g., 10 seconds). Stream availability logic 305 may detect gateway timeouts.

Stream sequencing and error logic 310 may validate the media streams to ensure that the video chunks are properly sequenced. Stream sequencing and error logic 310 may ensure that the video chunks are sequenced and not jumping or missing. Playlists are updated after a predetermined time (e.g., every x seconds) as defined by the protocol. Stream sequencing and error logic 310 may monitor every playlist with in a channel and follows the stream by continually looking for HTTP headers in the video chunks Stream sequencing and error logic 310 may also detect gateway timeouts (e.g., based on receipt of 504 gateway error messages).

Multiple channel validation logic 315 may provide different modes for validating the live media streams. Multiple channel validation logic 315 may simultaneously run in multiple modes. The different modes may be determined based on different levels of ongoing or periodic monitoring, levels of sampling for periodically sampled channels, and different aspects of the video streams (e.g., video output, audio output, etc.). These modes may include a continuous mode, a health check mode and a video mode.

According to one embodiment, multiple channel validation logic 315 may provide a continuous mode that continuously monitors and validates the live media streams. Multiple channel validation logic 315 may run the continuous mode for all channels with different streams for different clients to ensure that problems are immediately identified and/or solved. This may require heavy data traffic across networks. Multiple channel validation logic 315 may run across all playlists in a channel continuously (i.e., validation of live media streams for twenty four hours a day, seven days a week). Multiple channel validation logic 315 may run for recurring periods (e.g., after "x" seconds) for each playlist. Multiple channel validation logic 315 may caches previous playlist and calls the video chunks only in instances in which there are updates. Multiple channel validation logic 315 may run all of the playlists concurrently using threads. Multiple channel validation logic 315 may optimize the number of network calls by finding (identifying) unique playlist in channels for a live media stream across different clients for a plurality of channels associated with the live media stream. For example, tablets and phones may share the same playlist for a set of media files of the same bandwidth. Multiple channel validation logic 315 may perform (run) a single validation test for the different clients platforms that share the playlist). For example, multiple channel validation logic 315 may perform a same test for plurality of channels associated with the live media stream (e.g., both the tablets and phones). This may drastically reduce the number of network calls.

Multiple channel validation logic 315 may provide a health check mode. The health check mode may provide reduced traffic on service provider system from diagnostic processes. Multiple channel validation logic 315 may validating the live media stream after a predetermined time based on a predetermined sampling format to check a health of a system associated with the at least one live media stream. The health check mode may run after a predetermined extended period (e.g., ever "y" minutes) to check the health of the system. The health check mode may be applied based on predetermined sampling format to ensure that particular quality standards are applied to particular platforms while reducing the traffic on the system.

Multiple channel validation logic 315 may provide a video mode that displays (shows) what is happening to the video in a similar manner that the customer (client devices 150) would see. Multiple channel validation logic 315 may decrypt the video and show the video in the form of tiles for each channel. Multiple channel validation logic 315 may display the video in a tile format (e.g., tiles for tablet, phone, Xbox) for each format for each channel.

Notifications logic 320 may display a live dashboard for every playlist in a channel (both for audio and video channels). Notifications logic 320 may monitor the live video streams to determine variances or errors. Notifications logic 320 may determine that the live video stream has failed to comply with a predetermined standard (e.g., the live video stream may be improperly sequenced, that the live media stream has a missing or incomplete playlists, that the live media stream includes HTTP errors, etc.). Notifications logic 320 may alert network personnel regarding detected issues based on the live media stream failing compliance with the predetermined standards. Notifications logic 320 may inform preselected parties (e.g., a network operations team) when variances from the predetermined standard or errors are detected. Notifications logic 320 may allow personnel, such as a network operations center, to receive video and detect errors, variances, and at the same time that the customer receives. Notifications logic 320 may enable the network operations center to know at an instant (i.e., simultaneously with the customer) that a problem is happening with a customer. Notifications logic 320 may alert the network operations center on any issues.

Figure 4:
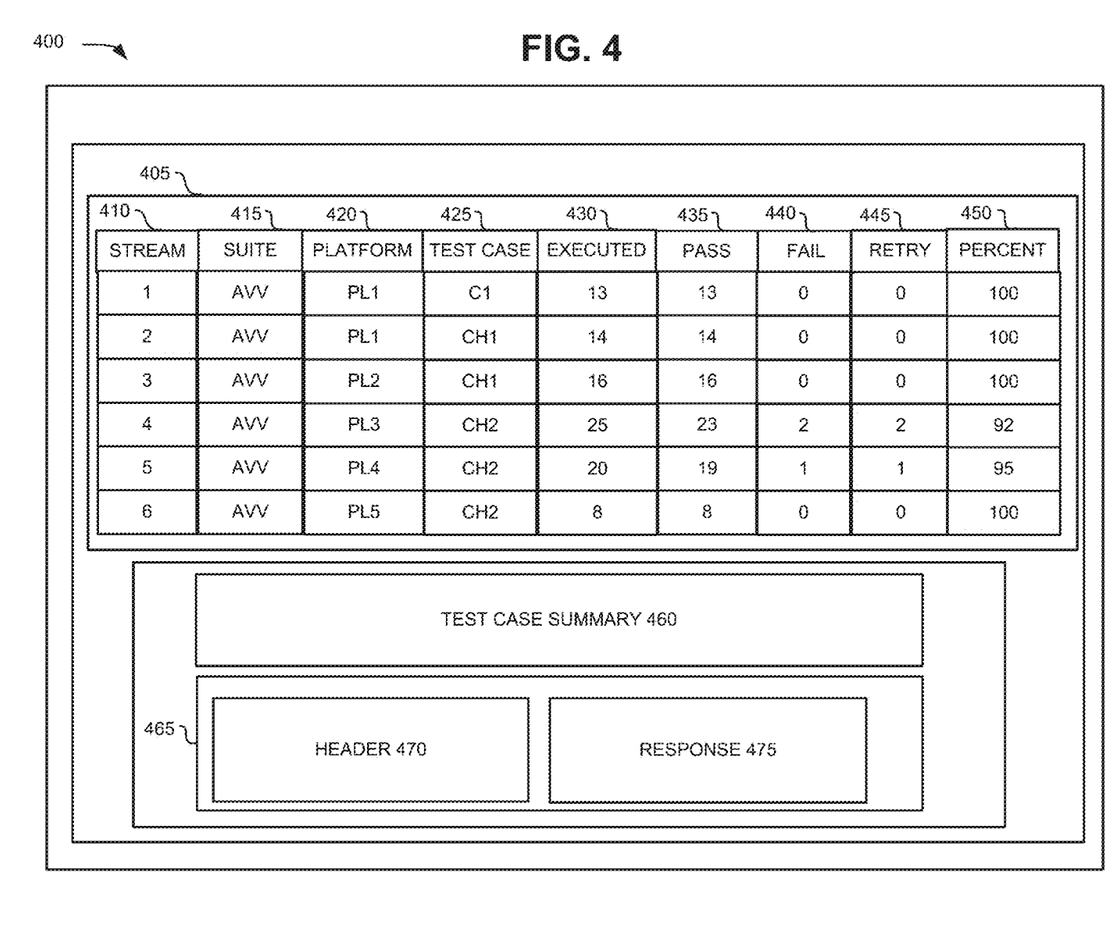
FIG. 4 is an exemplary live stream validation dashboard interface.

FIG. 4 is an exemplary live stream validation dashboard interface 400. As shown in FIG. 4, live stream validation dashboard interface 400 may provide graphical elements that include a representation of a test suite summary 405, a test case summary 460 and a test execution report 465. Test execution report 465 may include a particular test that has a header 470 and a response 475.

Test suite summary 405 may provide a summary of a test suite 415 that may be expected to validate the streams, playlists and segments based on the application of one or more test cases to the streams, playlists and segments. Test suite summary 405 may include a stream ID 410, test suite (descriptor) 415, a platform 420, a test case 425, an executed test (status) 430, a test passed (status) 435, a test failed (status) 440, a retry 445 and a percentage column 450.

Stream ID 410 may indicate an identifier associated with a stream that is available for download and is being tested. Suite (i.e., test suite) 415 may indicate a package of tests that may be run on the stream to identify potential issues associated with the stream that may prevent playback of the stream at client device in accordance with an expected playback, including format, sequence and timing. For example, stream ID 1, the first entry of test suite summary 405 includes test suite 415 which is an audio video validation (AVV) suite. The test suite 415 may include a stale playlist validation test as described below with respect to stale playlist validation 500), an error validation test (as described below with respect to error validation 600) and a duration sequencing test (as described below with respect to duration sequencing validation 700). Platform 420 may indicate the type of platform that the live media stream is being validated on (e.g., shown as platform 1 (PL1) for stream 1 in FIG. 4, such as a smart phone, Xbox, etc.). Test case 425 may indicate a particular live media stream that is being validated (shown for stream 1 as Channel 1 (CH1)). Executed test 430 may indicate a number of test cases executed for that particular live stream and platform. Test passed 435 may indicate a number of the executed tests 430 that have passed (i.e., detected no errors or variances from normal playback) while test failed 440 may indicate a number of the executed test that have failed (i.e., detected no errors or variances from normal playback). Retry 445 may indicate a number of retries of failed tests 440. Percentage column 450 may indicate the percentage of tests passed 435 for the test case 425.

Test case summary 460 may provide a summary of the application of a particular test case 425 to a live media stream for a particular platform and content. Test case summary 460 may provide particular information for the test case 425 associated with validation of a particular component of the media stream including a test suite 415, a platform 420, a test case ID, tests passed 435, test failed 440 and pass percentage 450.

Test execution report 465 may provide a report of the test case 425 for the particular live media stream (or segment of the life media stream) and platform. Test execution report 465 may include a header 470 of the test packet used to validate the live media stream and a response 475 of the live media stream to the test case 425.

Figure 5:
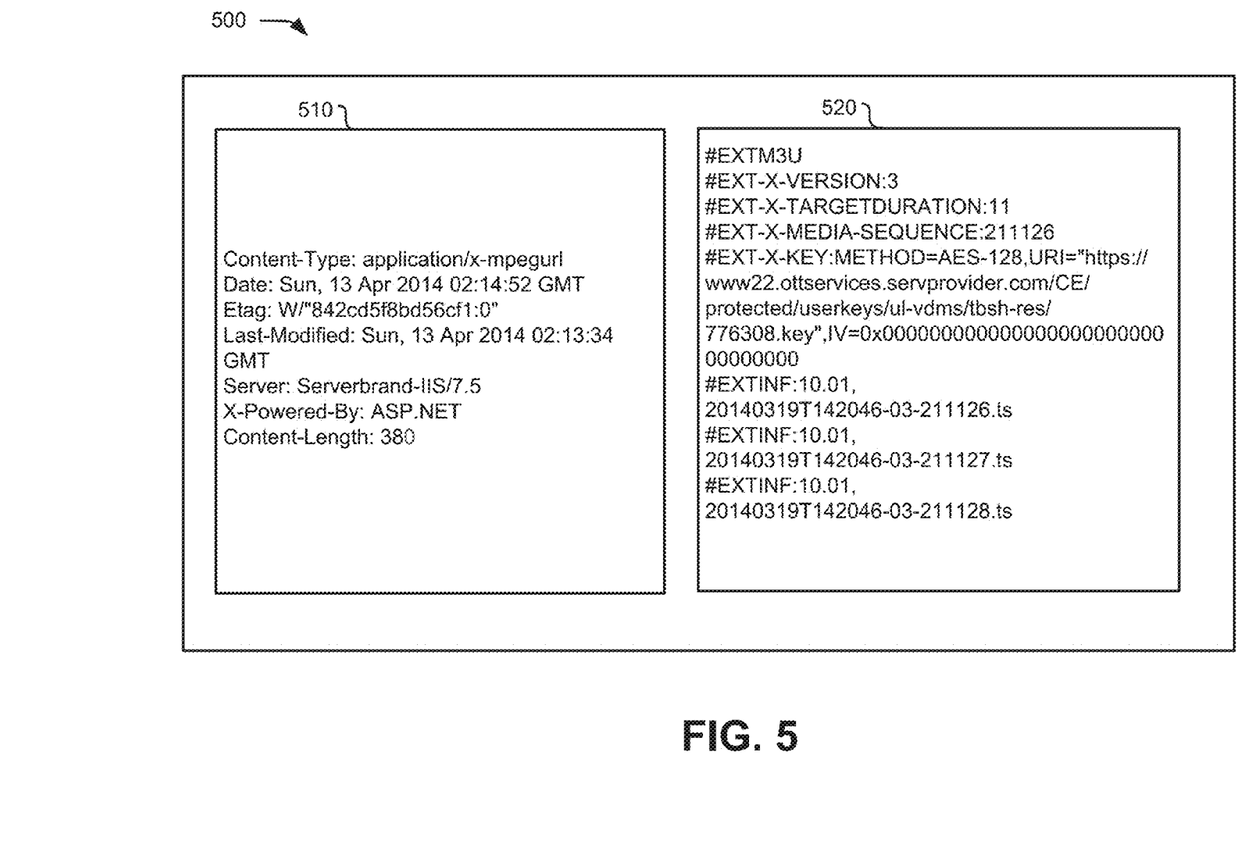
FIG. 5 illustrates an exemplary stale playlist validation file.

FIG. 5 is an exemplary stale playlist validation file 500. As shown in FIG. 5, state playlist validation file 500 may include a header 510 and a response 520.

Stale playlists may occur when playlists are not updated by a predetermined time. Client devices 150 require updated playlists every the predetermined time (e.g., x seconds). In instances when the playlist are not updated, the client device 150 may receive an old playlist and then loop back to previous position in the audio and/or video. Live media stream validation client 160 may ensure that the client devices 150 have received the updated playlist file or report that the playlist file is stale in those instances that the client devices 150 do not receive the updated playlist file. Stale playlists may be caused by problems on the content distribution side or the publishing side of the system. The stale playlist validation test may be executed to determine whether there are stale playlists provided to client devices 150.

Header 510, displayed in FIG. 5, may correspond to a header 470 included in the test execution report 465 for a stale playlist validation test. Information shown in header 510 illustrates elements of the information that may be included in a header for a stale playlist validation test. Header 510 may include a content type (shown as Content-Type: application/x-mpegurl in FIG. 5). Header 510 may include a date of the test (shown as Date: Sun, 13 Apr. 2014 02:14:52 GATE in FIG. 5). Header 510 may include an entity tag (shown as Etag: W/"842cd5f8bd56cf1:0"). Header 510 may include a last modified time (shown as Last-Modified: Sun, 13 Apr. 2014 02:13:34 GMT in FIG. 5). Header 510 may include a server associated with the test (shown as Server: Serverbrand-IIS/7.5). Header 510 may include X-Powered-By: ASP.NET. Header 510 may include a content length of the test case (shown as Content-length: 380).

Response 520, displayed in FIG. 5, may correspond to a response 475 included in the test execution report 465 for a stale playlist validation test. Information shown in response 520 illustrates elements of the information that may be included in a response for a stale playlist validation test. Response 520 may include test execution information that defines the parameters of the test (shown as #EXTM3U. #EXT-X-VERSION:3, #EXT-X-TARGETDURATION:11, #EXT-X-MEDIA-SEQUENCE:211126, #EXT-X-KEY: METHOD=AES-128, URI="https://www22.ottservices.service provider.com/CE/protected/userkeys/ul-vdms/tbsh-res/776308.key", IV=0x00000000000000000000000000000000). EXT-X-TARGETDURATION:11 indicates a target duration of the playlist of 11 seconds.

Response 520 may include playlist files (shown as #EXTINF:10.01 20140319T142046-03-2111.26.ts. #EXTINF:10.01 201403197142046-03-211127.ts. #EXTINF:10.01 20140319T142046-03-211128.ts). Delays on the network may lead to a stale playlist file on the client devices 150 (and correspondingly on live media stream validation client 160). Response 520 may indicate whether the playlist files have been updated or if they have become stale.

Figure 6:
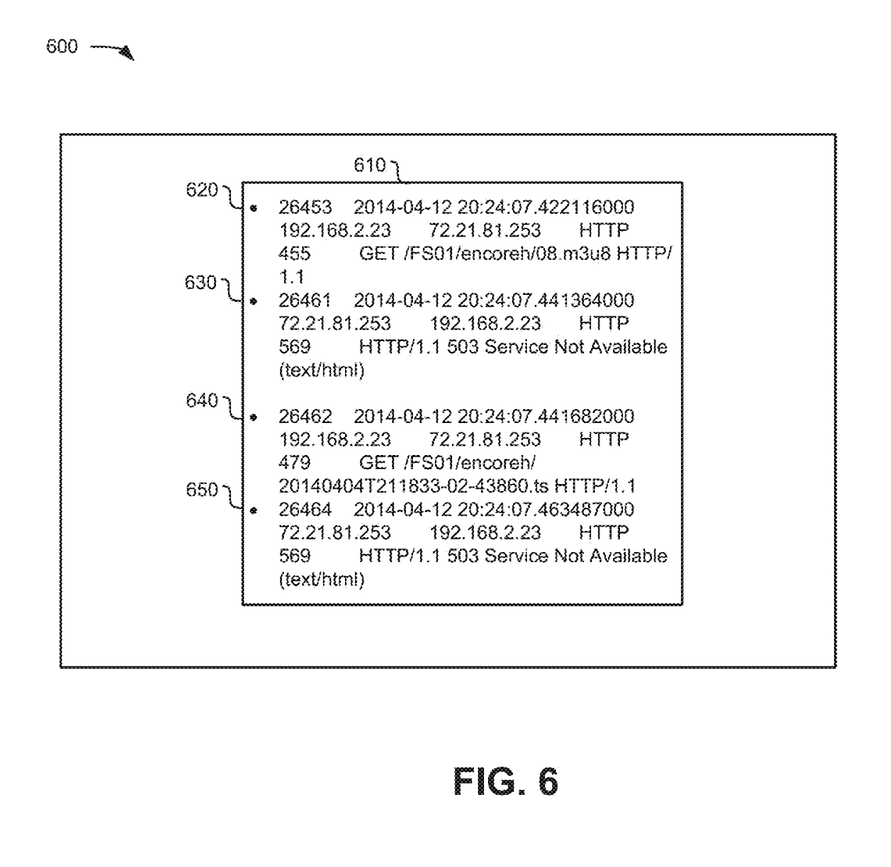
FIG. 6 illustrates an exemplary error validation file.

FIG. 6 is an exemplary error validation file 600. As shown in FIG. 6, error validation file 600 may include an error grouping 610 of requests (620 and 640) and corresponding responses (630 and 650).

Errors may arise when the client device 150 tries to get playlist file (e.g., system service is not available) and the live media stream may go blank (e.g., 500 or 503 error). For example, a component at a midpoint of the network may have timed out. Live media stream validation client 160 may monitor for these types of errors and HTTP issues. Error groups 610 may be generated based on common errors associated with groups of video segments.

Requests 620 and 640, displayed in FIG. 6, may correspond to HI"IP requests that may be included in the test execution report 465 for an error validation test. Information shown in requests illustrates elements of the information that may be included in a request for the error validation test. For example, request 620 may include request information formatted to implement testing in a similar manner to client devices 1150 (illustrated in FIG. 5 as 26453-2014-04-12 20:24:07.422116000 192.168.2.23, 72.21.81.253, HTTP 455 GET/FS01/encoreh/08.m3u8 HTTP/1.1).

Responses 630 and 650, displayed in FIG. 6, may correspond to responses 630/650 included in the test execution report 465 for an error validation test. Information shown in response 630 illustrates elements of the information that may be included in a response for an error validation test. Responses 630/650 may include 503/500 errors. For example, response 630, which may be received in response to request 620, includes response information, such as 26461 2014-04-12 20:24:07.441364000 72.21.81.253 192.168.2.23, HTTP 569, HTTP/1.1 503 Service Not Available (which may be displayed as text in HTML). This information may indicate that the service is unavailable (and that the live media stream has failed validation and may require attention from the network operations center).

Figure 7:
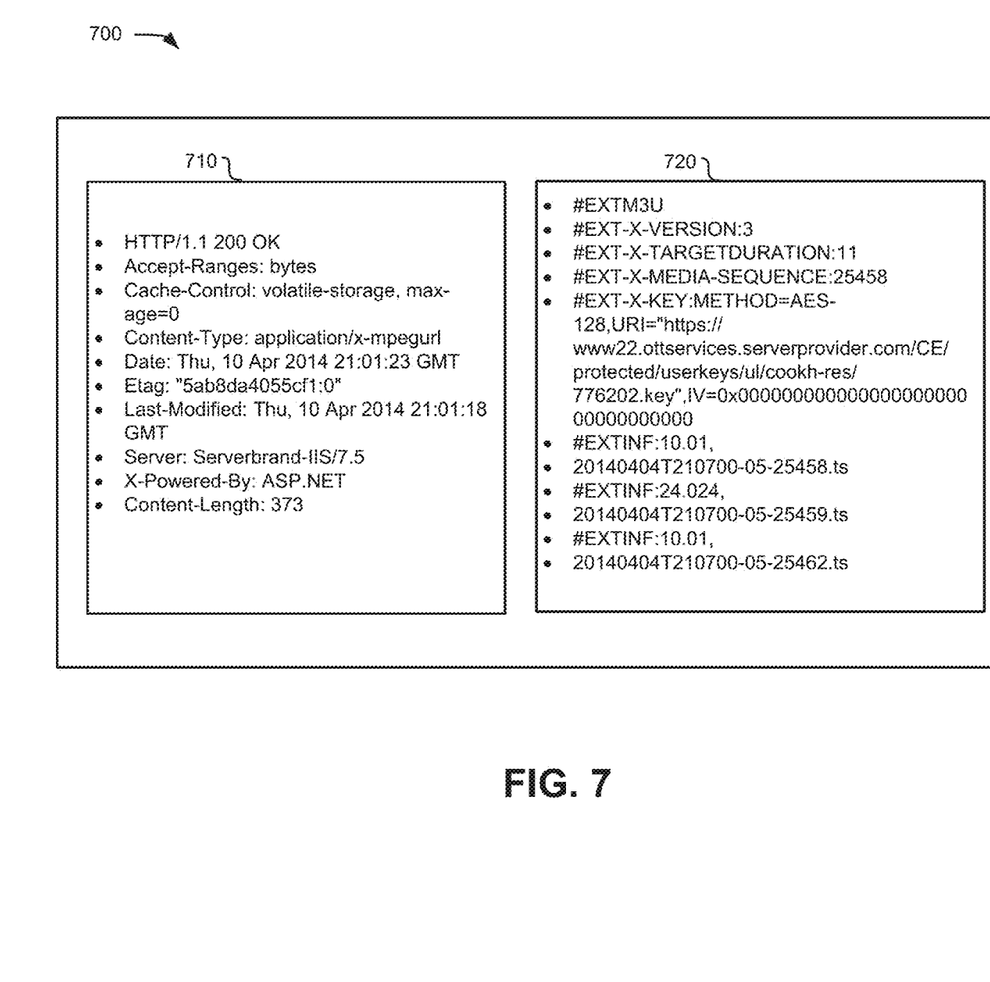
FIG. 7 illustrates an exemplary duration sequencing validation file.

FIG. 7 is an exemplary duration sequencing validation file 700. As shown in FIG. 7, duration sequencing validation file 700 may include a header 710 and a response 720.

Duration and/or sequencing errors may be received at client devices 150 in instances in which the files are improperly sequenced or of an incorrect duration. For example, the video chunks may be required to have a length within a particular target duration (maximum size). In some instances, the duration of the received file may exceed the target duration. In these instances in which the actual duration of the segment is greater than the target duration, then the actual video may buffer or skip a video chunk. Additionally, the sequence numbers of video chunks may be disordered in some instances. In other instances, the service provider may publish an incomplete playlist. Live media stream validation client 160 may ensure that the playlist are complete. Live media stream validation client 160 may identify where there are duration or sequencing errors in the live media streams received at client devices 150.

Header 710, displayed in FIG. 7, may correspond to a header 470 included in the test execution report 465 for a duration sequencing validation test. Information shown in header 710 illustrates elements of the information that may be included in a header for a duration sequencing validation test. Header 710 may include information that defines the test packets (illustrated in FIG. 7 as HTTP/1.1 200 OK, Accept-Ranges: bytes, Cache-Control: volatile-storage, max-age=0, Content-Type: application/x-mpegurl, Date: Thu, 10 Apr. 2014 21:01:23 GMT, Etag: "5ab8da4055cf1: 0", Last-Modified: Thu, 10 Apr. 2014 21:01:18 GMT, Server: serverbrand-IIS/7.5, X-Powered-By: ASP.NET, and Content-Length: 37). The header information may be parsed in order to determine timing information for the tests (Date: Thu, 10 Apr. 2014 21:01:23 GMT), associated servers (Server: serverbrand-IIS/7.5, X-Powered-By: ASP.NET), etc.

Response 720, displayed in FIG. 7, may correspond to a response 475 included in the test execution report 465 for a duration sequencing validation test. Information shown in response 720 illustrates elements of the information that may be included in a response for a duration sequencing validation test. Response 520 may include information regarding the target duration, segments numbers and method of testing executed in the duration sequencing test, (illustrated with respect to an HLS file as #EXTM3U, #EXT-X-VERSION:3, #EXT-X-TARGETDURATION:11, #EXT-X-MEDIA-SEQUENCE:25458. #EXT-X-KEY: METHOD=AES-128, URI="https://www22.ottservices.serviceprovider.com/CE/protected/userkeys/ul/cookh-res/776202.key", IV=0x00000000000000000000000000000000. #EXTINF: 10.01, 201404047210700-05-25458.ts. EXTINF:24.024, 20140404T210700-05-25459.ts. #EXTINF:10.01, 20140404T211.0700-05-25462.0.

With regard to FIG. 7, examination of the sequence information indicates that the video went from segment 59 (i.e., 20140404T210700-05-25459.ts) to segment 62 20140404T210700-05-25462.ts) and skipped two chunks. The error was generated when EXTINF (the target was 24 and exceeded the target duration. Live media stream validation client 160 may identify these errors and report the errors to appropriate service provider personnel.

Figure 8:
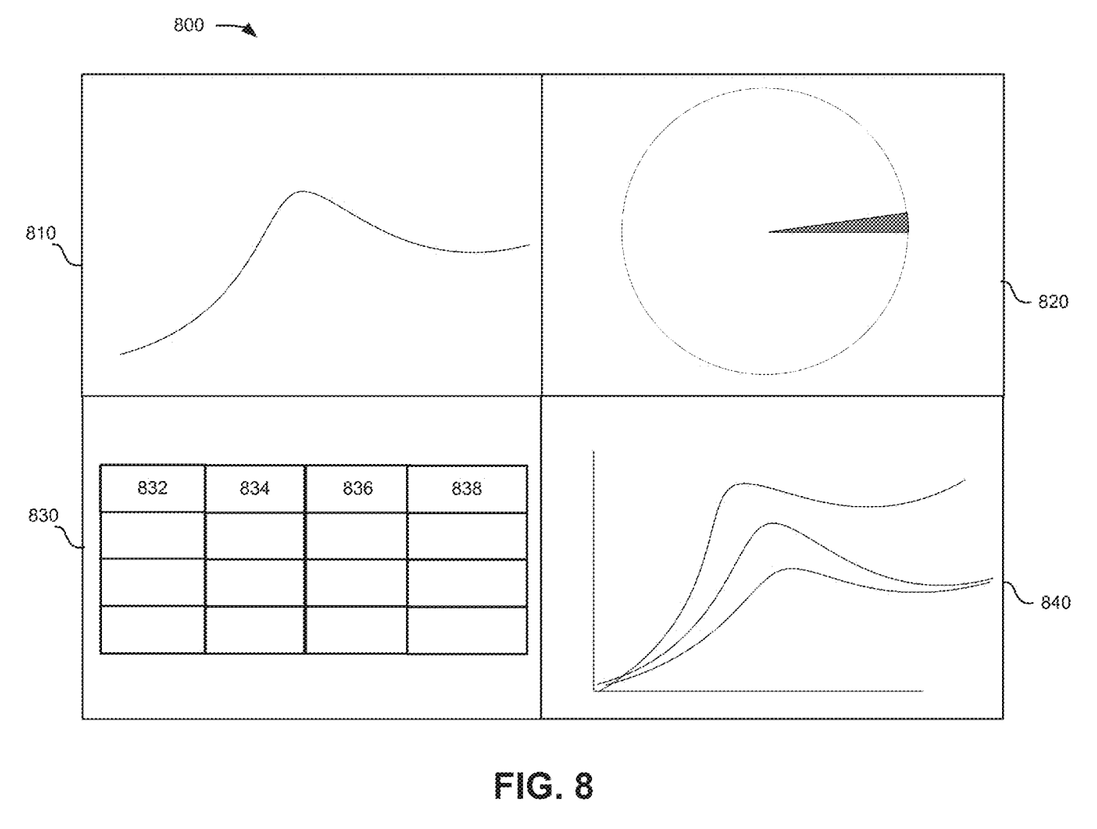
FIG. 8 illustrates an exemplary live stream data analysis dashboard interface.

FIG. 8 illustrates an exemplary live stream data analysis dashboard interface 800. As shown in FIG. 8, live stream data analysis dashboard interface 800 may include a live media stream validation spline 810, a statistical breakdown of errors graph 820, stream data 830 and historical spline 840.

As shown in FIG. 8, live stream data analysis dashboard interface 800 may present information regarding data analysis of validation of the live media streams to an end user in a plurality of ways. Live stream data analysis dashboard interface 800 may slice the data in different ways to emphasize different aspects of the data. Although particular ways of presenting the stream validation data is shown in live stream data analysis dashboard interface 800, it should be understood that the principles disclosed may be applied in other manners consistent with the disclosed to provide a comprehensive view of validation information for live media streams.

Live validation spline 810 may include current ("live") information based on validation of live media streams. Live validation spline 810 may include a spline (a numeric function that is piece-wise defined by polynomial functions) or curve that indicates when the amount of errors in the system over time. Live validation spline 810 may provide ongoing data points on health of a live media stream.

Statistical breakdown of errors graph 820 may aggregate errors and present the errors as a proportion of the validated media streams. For example, statistical breakdown of errors 820 is presented in a pie chart form in which the errors are a slice of the total validated live media streams.

Stream data 830 may provide data regarding live media streams. Stream data 830 may include a channel name 832, channel type 834, playlist name 836, status of live media stream 838 and other data (not shown) such as a count of tests and/or failed tests, etc.

Historical spline 840 may provide a historical spline that provides a long term view of errors in the system. The errors may be analyzed on a stream by stream and error type by error type basis.

Figure 9:
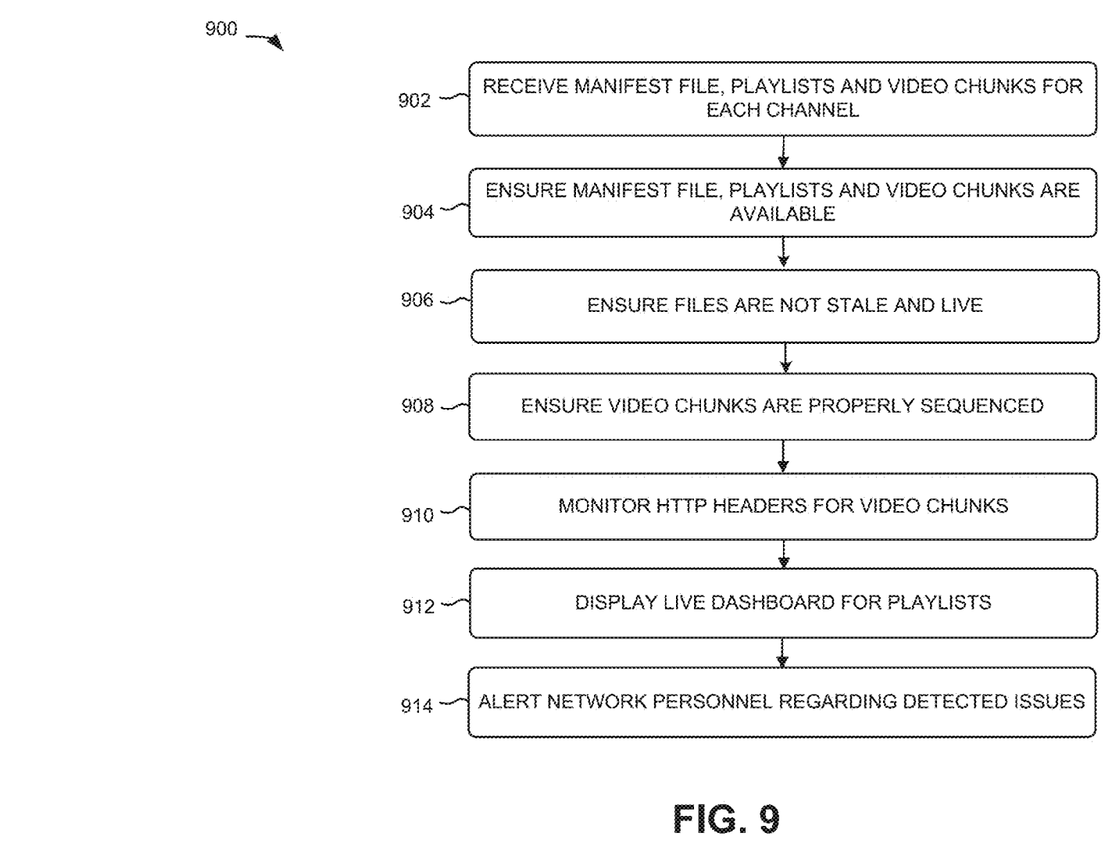
FIG. 9 is a flow diagram of an exemplary process for validating a live media stream according to an implementation described herein.

FIG. 9 is a flow diagram illustrating exemplary processing 900 associated with the above-described features of FIGS. 1-8. FIG. 9 is a flow chart of an exemplary process for validating a live media stream according to implementations described herein. In one implementation, process 900 may be performed by live media stream validation client 160. In another implementation, some or all of process 900 may be performed by another device or group of devices, including or excluding live media stream validation client 160.

Processing 900 may begin, at block 902, with live media stream validation client 160 receiving manifest file, playlists, and video chunks for each channel that is to be validated and/or displayed. For example, during production of the live media streams, issues may arise at the customer end when the customer watching is video that may freeze, buffer, or present other problems. Live media stream validation client 160 may allow the service provider to identify issues at the customer end. Live media stream validation client 160 may provide an end point tool from the customer perspective. Live media stream validation client 160 may request live media streams at the protocol level for multiple formats (e.g., HLS, smooth streaming, MPEG DASH, multiple internet streaming formats, etc.). Live media stream validation client 160 may be applied to media formats to validate media streams based on particular requirements and components of the media formats (e.g., smooth streaming, MPEG DASH, etc.).

At block 904, live media stream validation client 160 may ensure that the manifest files, playlists, and video chunks are available for each channel. For example, in instances in which a particular content item is to be validated, live media stream validation client 160 may check for manifest files, playlists, and video chunks for each platform.

Live media stream validation client 160 may ensure that the files are not stale and live (block 906). For example, live media stream validation client 160 may examine the playlist files to determine whether the current playlist files are updated from previous playlist files.

Live media stream validation client 160 may ensure that the video chunks are properly sequenced (block 908). Live media stream validation client 160 may examine the sequence number for video chunks to ensure that the video chunks are consecutively sequenced and that all video chunks associated with a particular playlist file have been included.

At block 910, live media stream validation client 160 may monitor HTTP headers for video chunks. Live media stream validation client 160 may access the actual video file. Live media stream validation client 160 may check both header and file to make sure the video is available for client devices 150 (e.g., no 500/503 errors).

Live media stream validation client 160 may display a live dashboard for playlists (block 912). The live dashboard may include validation information for different aspects of the live media streams.

Live media stream validation client 160 may alert network personnel regarding detected issues with the live media streams (block 914).

Embodiments described above relate to devices, methods, and systems for validating live media streams to ensure that the media streams play normally (i.e., according to a set or expected routine for playback of the media streams). The systems may validate the live media streams to ensure that the files are available, the files are not stale, and that video chunks are not improperly sequenced or missing.

The foregoing description of exemplary implementations provides illustration and description, but is no intended to be exhaustive or to limit the embodiments described herein to the precise form disclosed. Modifications and variations are possible in light of the above teachings or may be acquired from practice of the embodiments. For example, while series of blocks have been described with respect to FIG. 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method in a live stream validation client device, wherein the live stream validation client device includes a stream availability logic component, a stream sequencing and error logic component and a notification logic component, comprising:
   receiving, by the stream availability logic component, at least one manifest file, playlists and video chunks for at least one channel of at least one live media stream;
   validating, by the stream availability logic component, the at least one live media stream to ensure that the at least one manifest file, the playlists and the video chunks are available, wherein validating the at least one live media stream includes determining whether the at least one live media stream complies with at least one predetermined standard, and indicating that the at least one live media stream is validated if it complies with the at least one predetermined standard;
   validating, by the stream availability logic component, the at least one live media stream to ensure that the playlists are not stale and are live;
   validating, by the stream sequencing and error logic component, the at least one live media stream to ensure that the video chunks are consecutively sequenced; and
   validating, by the notification logic component, the at least one live media stream based on Hypertext transfer protocol (HTTP) headers for the video chunks to determine whether errors are received associated with the at least one live video stream.

2. The method of claim 1, further comprising:
   validating the at least one live media stream to ensure that the playlists are complete.

3. The method of claim 2, wherein validating the at least one live media stream to ensure that the files are not stale and are live further comprises:
   determining whether the published time of the video chunks is older than a predetermined limit.

4. The method of claim 1, further comprising:
   displaying a live dashboard for the at least one live media stream, wherein the live dashboard includes information regarding validation of the at least one manifest file, the playlists and the video chunks for each monitored channel of the at least one live media stream.

5. The method of claim 1, further comprising:
   determining that the at least one live media stream has failed to comply with the at least one predetermined standard; and
   alerting network personnel regarding detected issues based on the at least one live media stream failing compliance with the at least one predetermined standard.

6. The method of claim 1, further comprising:
   detecting a gateway timeout based on validation of the HTTP headers for the video chunks.

7. The method of claim 1, wherein the at least one channel comprises a plurality of channels, further comprising:
   identifying a same playlist across different clients for the plurality of channels associated with the live media stream; and
   performing a single validation test for the different clients for the plurality of channels associated with the live media stream.

8. The method of claim 1, further comprising:
   validating the at least one live media stream after a predetermined time based on a predetermined sampling format to check a health of a system associated with the at least one live media stream.

9. The method of claim 1, wherein the at least one channel comprises a plurality of channels, further comprising:
   decrypting a video associated with the at least one live media stream and displaying the video in a form of tiles for each of the plurality of channels.

10. The method of claim 1, further comprising:
    determining whether the at least one live media stream conforms to a particular format.

11. The method of claim 1, further comprising:
    examining the HTTP headers to determine parameters for the video chunks, wherein the parameters include a request time, and a last modified time.

12. A live stream validation client device, wherein the live stream validation client device includes a stream availability logic component, a stream sequencing and error logic component and a notification logic component, comprising:
    a memory to store a plurality of instructions; and
    a processor configured to execute the instructions in the memory to:
      receive, by the stream availability logic component, at least one manifest file, playlists and video chunks for at least one channel of at least one live media stream;
      validate, by the stream availability logic component, the at least one live media stream to ensure that the at least one manifest file, the playlists and the video chunks are available, wherein validating the at least one live media stream includes determining whether the at least one live media stream complies with at least one predetermined standard, and indicating that the at least one live media stream is validated if it complies with the at least one predetermined standard;
      validate, by the stream availability logic component, the at least one live media stream to ensure that the playlists are not stale and are live;
      validate, by the stream sequencing and error logic component, the at least one live media stream to ensure that the video chunks are consecutively sequenced; and
      monitor, by the notification logic component, Hypertext transfer protocol (HTTP) headers for the video chunks to determine whether errors are received associated with the at least one live video stream.

13. The device of claim 12, wherein the processor is further to:
    display a live dashboard for the at least one live media stream, wherein the live dashboard includes information regarding validation of the at least one manifest file, the playlists and the video chunks for each monitored channel of the at least one live media stream.

14. The device of claim 12, wherein the processor is further to:
   determine that the at least one live media stream has failed to comply with the at least one predetermined standard; and
   alert network personnel regarding detected issues based on the at least one live media stream failing compliance with the at least one predetermined standard.

15. The device of claim 12, wherein the processor is further to:
   detect a gateway timeout based on validation of the HTTP headers for the video chunks.

16. The device of claim 12, wherein the at least one channel comprises a plurality of channels and the processor is further to:
   identify a same playlist across different clients for the plurality of channels associated with the live media stream; and
   perform a single validation test for the different clients for the plurality of channels associated with the live media stream.

17. The device of claim 12, wherein the processor is further to:
   validate the at least one live media stream after a predetermined time based on a predetermined sampling format to check a health of a system associated with the at least one live media stream.

18. The device of claim 12, wherein the at least one channel comprises a plurality of channels and the processor is further to:
   decrypt a video associated with the at least one live media stream and displaying the video in a form of tiles for each of the plurality of channels.

19. A non-transitory computer-readable medium including instructions to be executed by a processor in a live stream validation client device, wherein the live stream validation client device includes a stream availability logic component, a stream sequencing and error logic component and a notification logic component, the instructions including one or more instructions, when executed by the processor, for causing the processor to:
   receive, by the stream availability logic component, at least one manifest file, playlists and video chunks for at least one channel of at least one live media stream;
   validate, by the stream availability logic component, the at least one live media stream to ensure that the at least one manifest file, the playlists and the video chunks are available, wherein validating the at least one live media stream includes determining whether the at least one live media stream complies with at least one predetermined standard, and indicating that the at least one live media stream is validated if it complies with the at least one predetermined standard;
   validate, by the stream availability logic component, the at least one live media stream to ensure that the playlists are not stale and are live;
   validate, by the stream sequencing and error logic component, the at least one live media stream to ensure that the video chunks are consecutively sequenced; and
   validate, by the notification logic component, the at least one live media stream based on Hypertext transfer protocol (HTTP) headers for the video chunks to determine whether errors are received associated with the at least one live video stream.

20. The non-transitory computer-readable medium of claim 19, wherein the processor is configured to:
   display a live dashboard for the at least one live media stream, wherein the live dashboard includes information regarding validation of the at least one manifest file, the playlists and the video chunks for each monitored channel of the at least one live media stream.

* * * * *